3,705,184
1:1 CHROME-COMPLEXED AZOMETHINE
DYE DEVELOPERS
Arthur B. Goulston, Brighton, and Paul S. Huyffer, Lynnfield, Mass., assignors to Polaroid Corporation
No Drawing. Original application June 4, 1969, Ser. No. 830,480. Divided and this application Jan. 17, 1972, Ser. No. 218,229
Int. Cl. C07f 11/00
U.S. Cl. 260—438.5 R    8 Claims

ABSTRACT OF THE DISCLOSURE

Novel azomethine dyes and 1:1 chrome-complexed azomethine dye developers (dyes containing a silver halide developing substituent) obtained therefrom, which complexes are of particular use in color photography.

CROSS REFERENCE TO RELATED APPLICATIONS

This application is a division of U.S. patent application Ser. No. 830,480 filed June 4, 1969.

BACKGROUND OF THE INVENTION

The copending application of Elbert M. Idelson, Ser. No. 830,499, filed concurrently, now U.S. Pat. No. 3,597,200 relates to novel 1:1 chrome-complexed azomethine dye developers and to their use in photographic products, processes and compositions such as are described and claimed in U.S. Pat. No. 2,983,606 issued to Howard G. Rogers.

SUMMARY OF INVENTION

The present invention is directed to a novel class of 1:1 chrome-complexed azomethines, particularly yellow azomethine dyes, within the scope of those complexes described in the aforementioned copending application of Elbert M. Idelson.

A primary object of this invention, therefore, is to provide novel dyes useful in color photography.

Another object is to provide novel 1:1 chrome-complexed azomethine dyes.

A further object is to provide novel azomethines of particular use in the preparation of the aforementioned 1:1 complexes.

Other objects of the invention will in part be obvious and will in part appear hereinafter.

The invention accordingly comprises the product possessing the features, properties and the relation of components which are exemplified in the following disclosure, and the scope of the application of which will be indicated in the claims.

For a fuller understanding of the nature and objects of the invention, reference should be had to the following detailed description.

The novel dye complexes of this invention may be defined as chrome-complexed azomethine dyes of the formula:

(A) 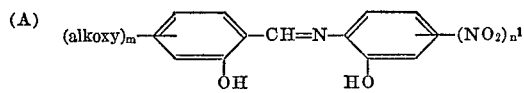

wherein the alkoxy moiety contains 1–8 carbon atoms, e.g., methoxy, ethoxy, propoxy, isopropoxy, butoxy, isobutoxy pentoxy, 3-methyl-butoxy, hexoxy and octoxy; and $n^1$ and $m$ each are positive integers from 1 to 2; the complexed dyes further being characterized as having bonded to the chromium complexing atom by two coordinating atoms a substantially colorless ligand containing a p-dihydroxyphenyl substituent. Preferably, $m$ is 2; the alkoxy moiety has less than six carbon atoms, the two alkoxy substituents being in the 2- and 4-positions, $n^1$ is 1; and the nitro group is in the 3-position.

Ligands containing a p-dihydroxyphenyl silver halide developing substituent (so-called "developer-ligands") are disclosed in the copending application of Elbert M. Idelson, Ser. No. 487,054, filed Aug. 13, 1965.

A preferred class of developer-ligands disclosed in this copending application and contemplated by the present invention are those within one of the following formulae:

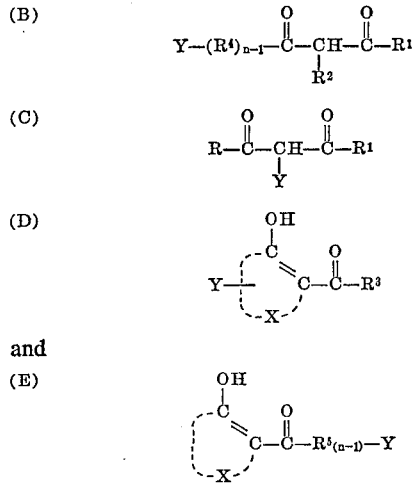

and (E)

wherein R and $R^1$ are alkyl, alkoxyalkyl, fluoroalkyl, alkylamino, phenyl or a phenylamino radical; $R^2$ may be hydrogen, alkyl or a phenyl radical; $R^3$ may be alkyl hydroxy, or hydrogen; $R^4$ may be alkylene, phenylene or a phenylamino radical; $R^5$ is alkylene; Y is a radical comprising a p-dihydroxyphenyl silver halide developing substitutent; X represents the atoms necessary to complete a 5 or a 6-membered aliphatic ring or a benzene ring; and $n$ is a positive integer from 1 to 2. The alkyl moieties of the above-mentioned substituents preferably contain 1–4 carbon atoms.

As examples of ligands which may be employed to obtain the above ligand-developers, mention may be made of acetylacetone; salicylaldehyde; p-methoxy salicylaldehyde; 2,4-hexanedione; trifluoroacetylacetone; acetoacetanilide; 2-acetyl - cyclohexanone; methoxyacetylacetone; 2-acetylcyclopentanone; 2-propionyl-cyclopentanone, etc.

As examples of radicals comprising a p-hydroxyphenyl silver halide developing substitutent, mention may be made of hydroquinone and substituted derivatives thereof, e.g., methylhydroquinone, p-methylphenylhydroquinone, chlorohydroquinone, methoxyhydroquinone, 2,6-dimethyl-hydroquinone, 2,6 - dimethoxyhydroquinone; 2-methoxy-6-methyl - hydroquinone, 2,3-dimethylhydroquinone, 2,5,6-trimethyl-hydroquinone, etc. In addition to the above-mentioned substitutents contributing to the silver halide developing function, the benzene nucleus of the hydroquinonyl radical may contain other substitutents for linking the p-dihydroxyphenyl developing moiety to the ligand moiety. As examples of such linking substituents, mention may be made of divalent organic linking groups such as the aminophenalkyl-thio substituents disclosed in U.S. Pat. No. 3,009,958; aminoalkylamino substituents such as disclosed in U.S. Pat. No. 3,002,997; aminophenalkyl substituents such as disclosed in U.S. Pat. No. 3,019,107; alkyl-thio substituents such as disclosed in U.S. Pat. No. 3,043,690; aminoalkyl substituents such as disclosed in U.S. Pat. No. 3,062,884; aminophenyl substituents such as disclosed in U.S. Pat.

No. 3,142,564; aminophenoxy substituents such as disclosed in U.S. Pat. No. 3,061,434; —NHCO— and —NHCO—alkylene— substituents such as disclosed in U.S. Pats. Nos. 3,288,778, etc.

As examples of ligand-developers disclosed in the aforementioned application Ser. No. 487,054, mention may be made of the following compounds.

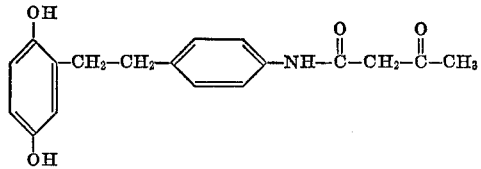

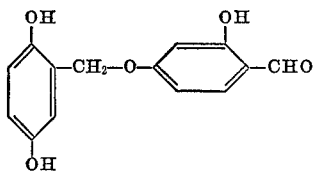

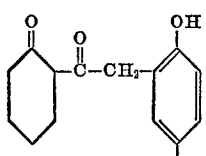

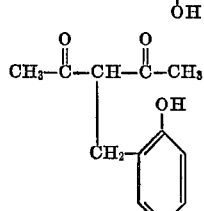

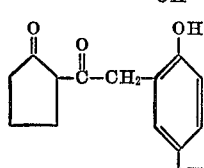

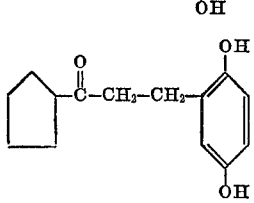

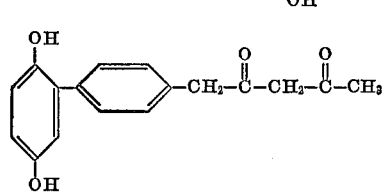

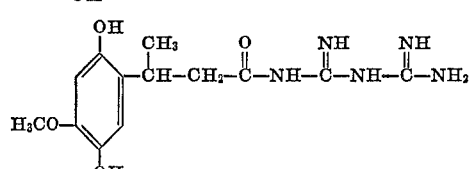

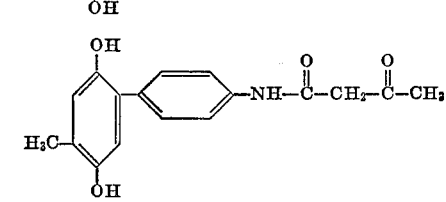

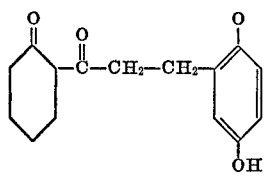

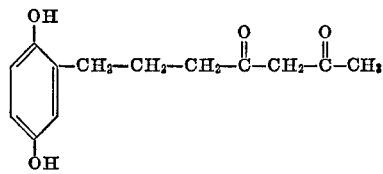

The novel chrome-complexed azomethine dyes of this invention derived from the non-complexed dyes of Formula A and containing a developer-ligand of the foregoing description, may be represented as being within one of the following formulae:

(F)
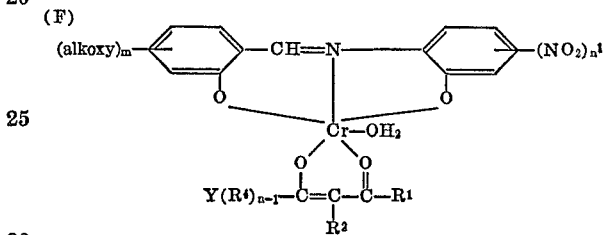

(G)
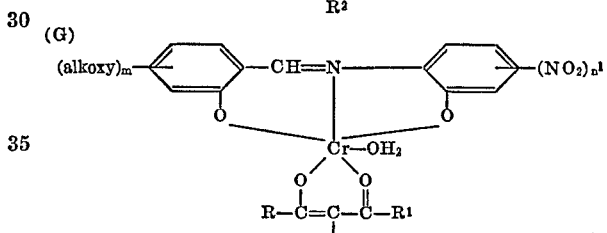

(H)
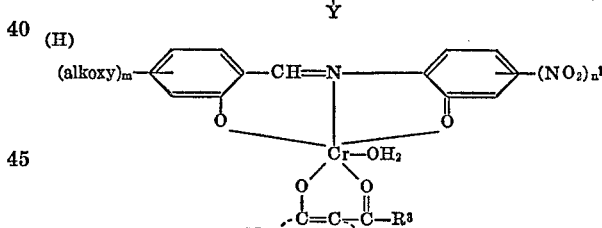

and
(I)
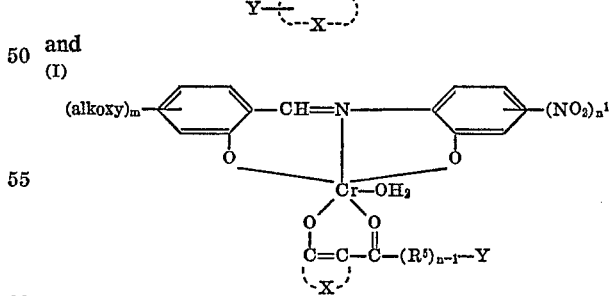

The preferred 1:1 chrome-complexed dyes of this invention are those of the formula:

(J)
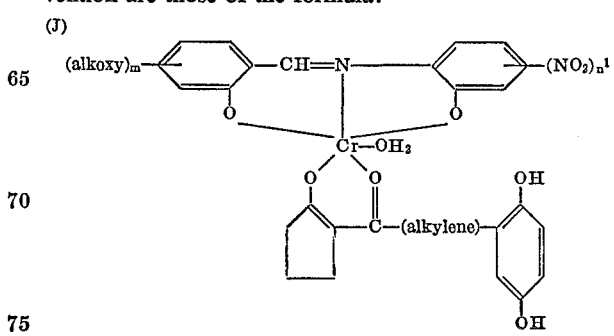

wherein the alkoxy moiety, $m$ and $n$ are as heretofore noted, and the alkylene moiety contains 1–4 carbon atoms, i.e, methylene, ethylene, propylene, isopropylene, butylene or isobutylene.

As examples of useful dyes which may be employed in preparing these novel complexes, i.e., azomethine dyes within the scope of Formula A, mention may be made of the following:

(1)–(13) [chemical structures of azomethine dyes with varying alkoxy substituents and nitro-substituted aniline moieties]

As examples of useful complexed dyes within the scope of this invention, mention may be made of the following:

(14)–(18) [chromium complexed azomethine dye structures]

(19) 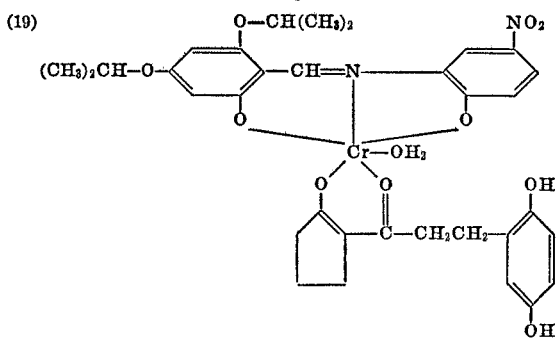

(20) 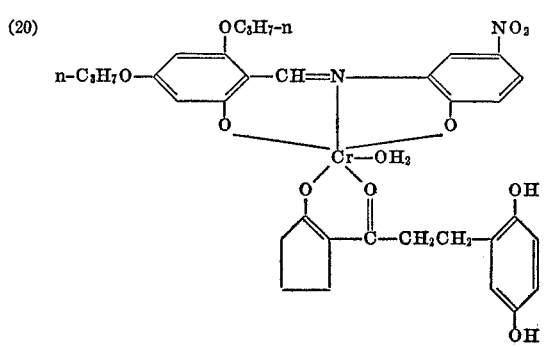

(21) 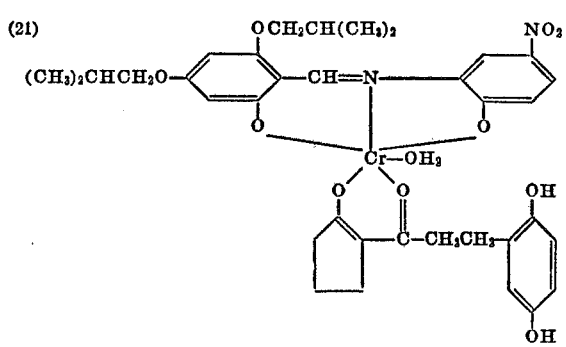

(22) 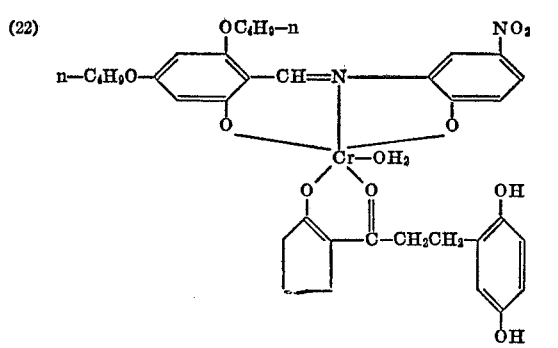

(23) 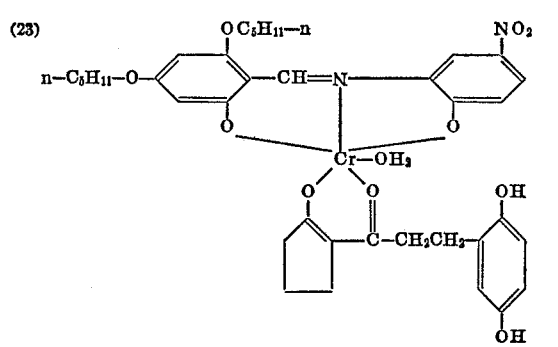

(24) 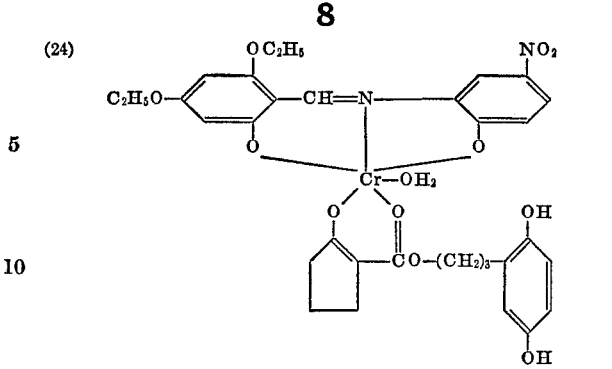

(25) 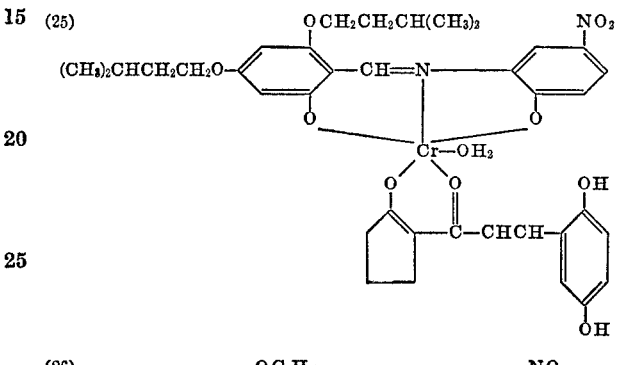

(26) 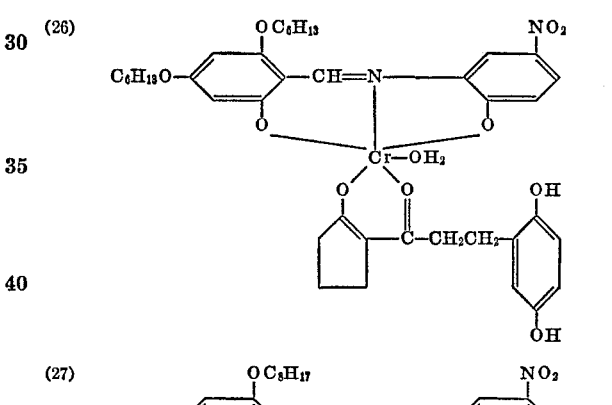

(27) 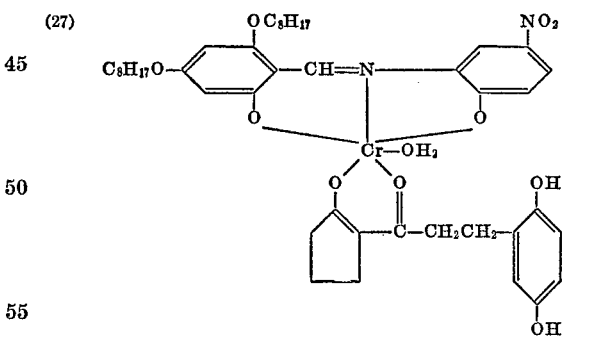

While the present invention contemplates azomethines wherein the designated alkoxy moiety may contain as many as eight carbon atoms, it has been found that where it contains more than five carbon atoms, the complexed dye developers of this invention do not transfer as readily and hence are not as desirable for use in the photographic systems described in the aforementioned U.S. Pat. No. 2,983,606. Hence in the preferred complexes of Formulae F–J, the alkoxy moiety contains 1–5 carbon atoms.

The desired non-complexed azomethine dyes of Formula A may be prepared by reacting an alkoxy-substituted o-hydroxybenzaldehyde with a nitro-substituted o-hydroxyaniline:

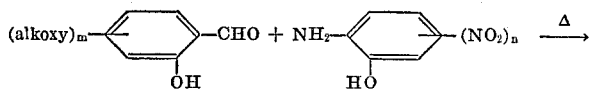

DYE OF FORUMLA A

The following examples illustrate the preparation of azomethine dyes within the scope of Formula A.

EXAMPLE 1

0.1 m. each of the aldehyde (I) and amine (II) were heated in 100 ml. of methyl Cellosolve for three hours on a steam bath. The resulting mixture was cooled to about 10° C. and filtered. To the solid product so obtained 100 ml. of methyl Cellosolve were added and this mixture was heated on a steam bath for about thirty minutes and then cooled to about 10° C. The resulting product was separated by filtration, washed with cold methyl Cellosolve and methanol and then air-dried to obtain an 80–90% yield of an azomethine dye of Formula H.

EXAMPLE 2

In the manner described in Example 1, 2-hydroxy-4,6-diisopropoxy-benzaldehyde and 2-hydroxy-5-nitro-aniline were reacted to yield the azomethine dye of Formula 6, M.P. 243° C.

In like manner were prepared the compounds of Formula 1, M.P. 276–276.5; Formula 2, M.P. 194–195; Formula 3, M.P. 303–4; Formula 4, M.P. 282–3; Formula 5, M.P. 247–8; Formula 7, M.P. 233–4; Formula 8, M.P. 228–9; Formula 9, M.P. 208–9; and Formula 10, M.P. 232–3, all melting points given in ° C.

To prepare the metal complexes of this invention, the azomethine dye, e.g., a dye as prepared in the above examples, may be reacted with a chromic salt and the desired ligand. In instances wherein the developer is on the ligand, the protected derivative thereof, e.g., the dicathyloxy analogue, is preferably employed to yield the corresponding chrome complex wherein the dihydroxy substituents are protected. The desired dihydroxy analogue is then obtained by hydrolysis.

This series of reactions may be illustrated as follows:

1.
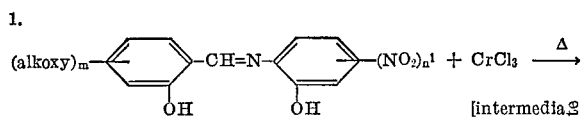

2.
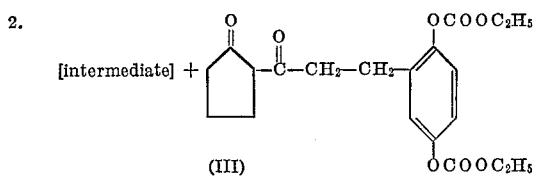

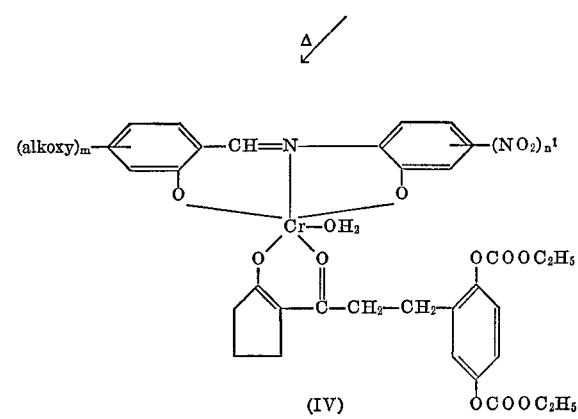

3.
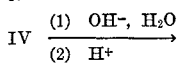
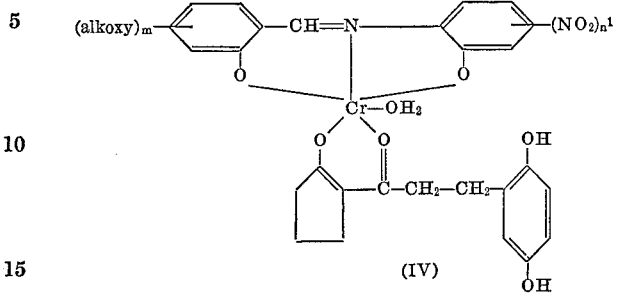

The following examples illustrate the preparation of the chrome complexes of this invention in accordance with the foregoing sequence of reactions.

EXAMPLE 3

0.06 m. of the azomethine of Formula H and 0.12 m. (32 g.) of $CrCl_3 \cdot 6H_2O$ were refluxed in 1 liter of methanol for 72 hours. 0.09 m. (36 g.) of the protected liganddeveloper (III) and 90 ml. of triethylamine were then added and the resulting slurry was refluxed for 1 hour and poured while still hot into a solution of 3 l. water/90 ml. conc. HCl. The resulting gummy product solidified on trituration and the cloudy supernatant liquid was decanted off. The product was washed several times with water by decantation, filtered off and air-dried to yield the protected chrome complex (IV). This complex was dissolved in 500 ml. of methyl Cellosolve by warming on a steam bath. The solution was cooled to room temperature and deaerated with nitrogen for 15–20 minutes. A deaerated solution of 36 ml. each of 50% W./W. aqueous sodium hydroxide solution and water was added all at once, producing a slight exotherm, and a moderately rapid stream of nitrogen was passed in for about 30 minutes. A deaerated solution of 120 ml. conc. HCl/1 l. water was added, first slowly and then more rapidly as the initial foaming subsided. The resulting gummy product soon solidified and the cloudy supernatant liquid was decanted off. The resulting chrome complex (V) was washed a few times with hot water by decantation, filtered off, dissolved in 500 ml. of hot methyl Cellosolve, and again filtered. 1 liter of a hot filtered solution of 1% HCl was poured into the above filtrate. A gummy product soon solidified and the supernatant liquid was decanted off. This product was washed several times with hot water by decantation, finally sucked dry and dried in vacuo. It was then dissolved in 500 ml. of warm acetone, the solution was filtered, and 1.5 l. of hexane was poured into it while stirring. The resulting gummy product was triturated until it solidified, filtered off, washed several times with hexane and dried in vacuo to yield the pure chrome complex (V).

EXAMPLE 4

In the manner described in Example 3, the chrome-complexed dye of Formula 16 was prepared, a yellow dye developer, $\lambda_{max.}=400$, $\epsilon=18,600$; $\lambda_{max.}=440$, $$\epsilon=17,400$$

in methyl Cellosolve.

EXAMPLE 5

In like manner, the chrome-complexed dye of Formula 15 was prepared, $\lambda_{max.}=400$, $\epsilon=18,400$; $\lambda_{max.}=440$, $\epsilon=17,200$ in methyl Cellosolve.

EXAMPLE 6

In like manner, the chrome-complexed dye of Formula 17 was prepared, $\lambda_{max.}=400\text{–}410$, $\epsilon=20,400$;

$$\lambda_{max.}=440$$

$\epsilon=19,400$ in methyl Cellosolve.

The remaining of the illustrative complexes of Formulae 11–21 were also prepared in the foregoing manner.

The following example illustrates the use of the novel complexed dyes of this envention in color photography.

EXAMPLE 7

The dye complex of Example 6 was precipitated from methyl Cellosolve into distilled water at a pH of about 1. The resulting precipitate was washed ten times and collected each time by means of a centrifuge. To the resulting paste was added 10% by weight (based on dye solids) of "Lomar D" (trademark of Nopco Chemical Co. for a sodium salt of a condensed mononaphthalene sulfonic acid dispersant) and a high shear mechanical agitator was then applied to form a dispersion. 10 cc. of the resulting dye dispersion (containing about 1.0 g. of dye) were mixed with 7.7 g. of 15% gelatin, 26.2 cc. of water and 2.8 cc. of 1% "Aerosol O.T." (trademark of American Cyanamid Co. for dioctyl ester of sodium sulfosuccinic acid wetting agent) and this mixture was then coated upon a subcoated film base at a calculated dry coverage of about 103 mg. of complexed dye developer per square foot of surface area. After this coating dried, a blue-sensitive silver iodobromide emulsion was coated thereupon at a coverage of about 100 mg. of silver per square foot of surface area. The resulting photosensitive element was exposed and the thus exposed element was then processed by spreading between the exposed photosensitive element and a superposed image-receiving element at a gap of about .0026 inch an aqueous procesing composition comprising the following proportion of ingredients:

|  | G. |
|---|---|
| Potassium hydroxide | 11.2 |
| Hydroxyethyl cellulose | 3.8 |
| Benzotriazole | 3.5 |
| Potassium thiosulfate | 0.5 |
| N-benzyl-α-picolinium bromide | 2.0 |
| Zinc nitrate | 0.5 |
| Lithium nitrate | 0.5 |
| 4'-methylphenyl hydroquinone | 0.2 |
| Water 100.0 cc. | |

The image-receiving element comprised a baryta paper support carrying, in order, a layer of a partial butyl ester of poly-(ethylene/maleic anhydride); a layer of polyvinyl alcohol; and a layer of a 2:1 mixture, by weight, of polyvinyl alcohol and poly-4-vinylpyridine. [Image-receiving elements of this type are disclosed in U.S. Pat. No. 3,362,819 issued to Edwin H. Land.] After an imbibition period of about 60 seconds, the two elements were separated to reveal a yellow transfer image, $D_{max.}$ of 1.90.

The novel chrome-complexed azomethines of this invention exhibit markedly greater stability against the color degradation effects of actinic radiation than do non-complexed dyes of similar color. This is consistent with the knowledge of those skilled in the art that dye complexes are more light stable, e.g., fade less or are less prone to color shift, than non-complexed dyes.

On the other hand, the present invention provides dyes possessing a color which makes them superior to prior dye complexes for multicolor photography. Thus the metal-complexed yellow dye developers of this invention give more faithful color recordation in multicolor photographic elements such as mentioned above including a yellow dye developer, a magenta dye developer and a cyan dye developer, than the heretofore known metal-complexed yellow dye developers. Stated another way, the metal-complexed yellow azomethines of this invention have superior spectral absorption curves giving less absorption in unwanted regions of the spectrum than do prior complexed yellow dye developers.

In summation, the yellow dye developers of this invention are more stable than prior non-complexed yellow dye developers and may be of superior color; while on the other hand, they possess a better color for multicolor photography than prior complexed yellow dye developers, although they are not necessarily more stable than these prior complexes. It will thus be seen that the present invention combines desirable features of prior yellow dye developers not heretofore obtainable to provide dye developers which, considering the combined features of color and stability, are superior to those heretofore known.

In addition, the azomethines of this invention are superior yellows to the general class of azomethines disclosed in the aforementioned copending application Ser. No. 830,499, thus in turn making them a superior group within this broader class of dyes for use in color photography.

The foregoing may be illustrated by comparing illustrative yellow dye developers of this invention with (I) a typical yellow complex of the prior art, the chromium complex of the yellow azo dye:

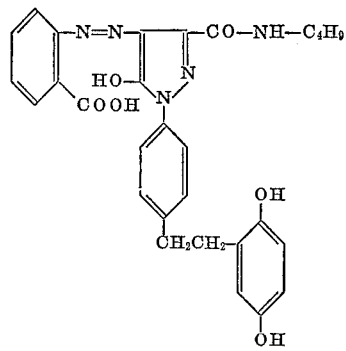

and (II) the standard test or control non-complexed yellow dye developer employed in evaluating the merits of yellow dye developers:

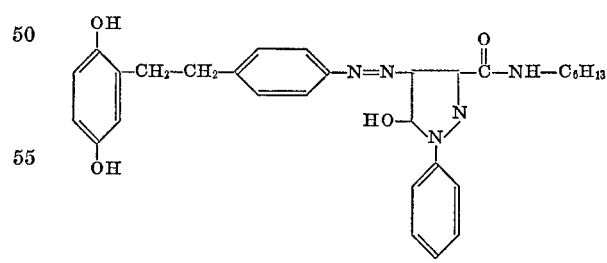

In order to do so, color images employing each of these dye developers were prepared under test conditions using standard controls so that the only essential difference in the three was the particular dye developer employed. In this instance, for each of the yellow dye developers to be compared, a photosensitive element comprising an emulsion layer and the dye developer layer was exposed and developed in the manner described in Example 7.

The resulting three dye images were subjected to a standard light stability test by placing under a xenon arc weatherometer for predetermined periods of time and calculating the percent of fading (loss of density) after each period of time.

The results comparing two of the yellow dye developer complexes of this invention with the aforementioned azo yellow dye developer complex and control non-complexed dye developer are shown in the following table.

TABLE

|  | Percent fading | | | |
| --- | --- | --- | --- | --- |
|  | 6 hrs. | 12 hrs. | 24 hrs. | 48 hrs. |
| Formula 17 | 0 | 0 | 0 | 0 |
| Formula 16 | 0 | 0 | 0 | 0 |
| Azo yellow complex | 2 | 6 | 3 | 5 |
| Non-complexed yellow | 13 | 35 | 63 | 88 |

As far as color is concerned, the dye developers of Formulae 16 and 17 were both superor to the azo yellow complex and non-complexed yellow controls, particularly in that the dye developers of this invention both exhibited substantially greater of the desired absorption in the blue region of the spectrum.

The dye developers of this invention are also quite stable to pH change. Thus, for example, whereas the aforementioned non-complexed yellow is pH sensitive and at a pH of between 5–7 shifts bathochromically towards the orange, the present dye developers do not.

Since certain changes may be made in the above product without departing from the scope of the invention herein involved, it is intended that all matter contained in the above description shall be interpreted as illustrative and not in a limiting sense.

We claim:

1. A 1:1 chrome-complexed azomethine dye within the formulae:

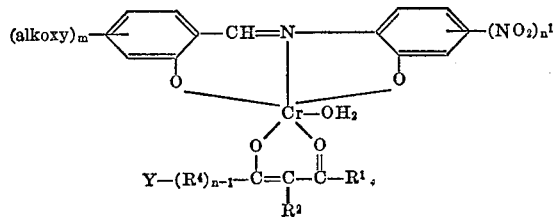

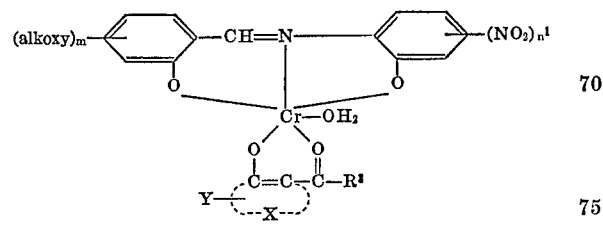

and

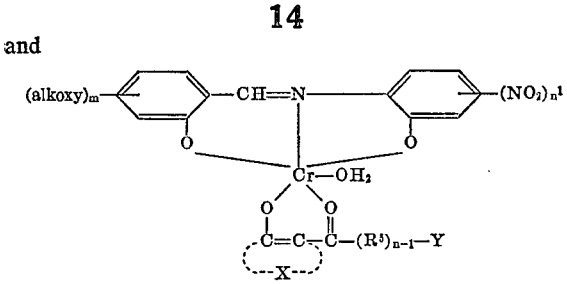

wherein the alkoxy moiety contains 1 to 8 carbon atoms, $n^1$ and $m$ each are positive integers from 1 to 2; R and $R^1$ each is alkyl, fluoroalkyl, alkoxyalkyl, phenyl or phenylamino; $R^2$ is hydrogen, alkyl or a phenyl radical; $R^3$ is alkyl, hydroxy or hydrogen; $R^4$ is alkylene, phenylene or a phenylamino radical, $R^5$ is alkylene, Y is a radical comprising a p-dihydroxyphenyl silver halide developing substituent; X represents the atoms necessary to complete a 5- or a 6-membered aliphatic ring or a benzene ring; and $n$ is a positive integer from 1 to 2.

2. A 1:1 chrome-complexed azomethine dye of the formula:

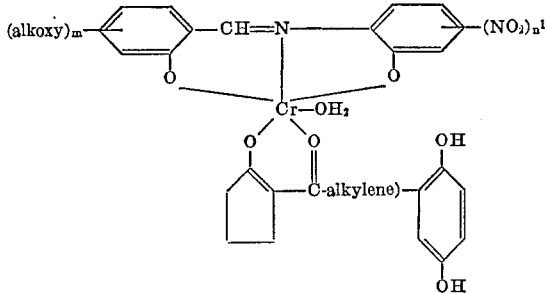

wherein the alkoxy moiety contains 1 to 8 carbon atoms, $n^1$ and $m$ each are positive integers from 1 to 2; and the alkylene moiety contains from 1 to 4 carbon atoms.

3. A dye as defined in claim 2 wherein $m$ is 2; $n^1$ is 1; and each alkoxy contains 1–5 carbon atoms.

4.

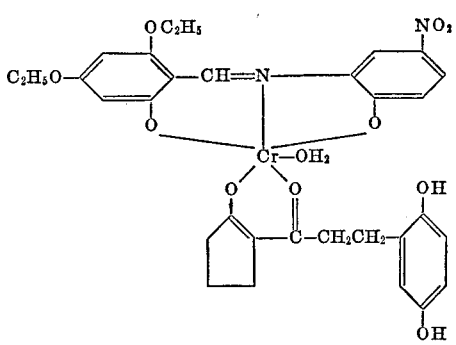

5.

6.
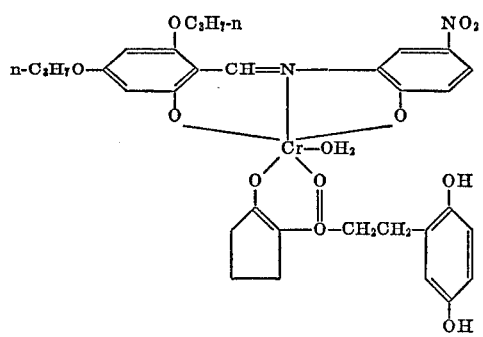
8.
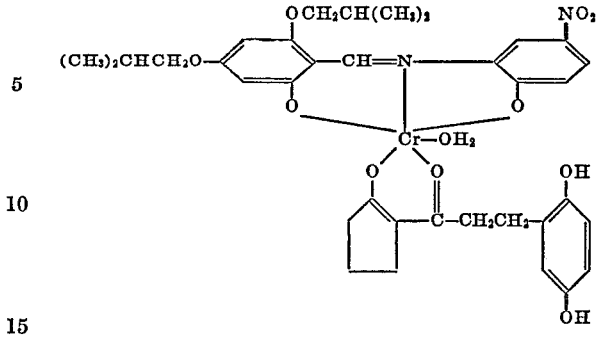
7.
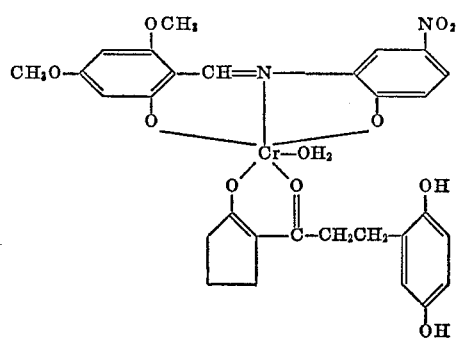
References Cited
UNITED STATES PATENTS
2,116,913  5/1938  Schmidt _____ 260—429 C
OTHER REFERENCES
Schetty, Helv. Chim. Acta, vol. 44, pp. 2193–2204 (1961).
Schetty, Helv. Chim. Acta, vol. 45, pp. 1026–30 (1962).
Schetty, Helv. Chim. Acta, vol. 45, pp. 1095–1102 (1962).
TOBIAS E. LEVOW, Primary Examiner
H. M. S. SNEED, Assistant Examiner
U.S. Cl. X.R.
96—29; 260—566